3,016,372
GLYCOSIDES OF THE PYRIDONE SERIES
Carl Peter Krimmel, Mundelein, Ill., assignor to G. D. Searle & Co., Chicago, Ill., a corporation of Delaware
No Drawing. Filed Dec. 13, 1956, Ser. No. 627,982
9 Claims. (Cl. 260—210)

The present invention is concerned with glycosides of the pyridone series, and specifically with glycosides which can be represented by the structural formula

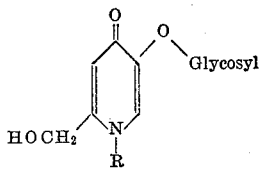

In this formula R can represent hydrogen, a lower alkyl radical, or a lower hydroxyalkyl radical. The lower alkyl radicals which R can represent can be selected from among straight- and branched-chain alkyl radicals containing fewer than 9 carbon atoms, but preferred embodiments of this invention are those in which, when R represents a lower alkyl radical, it represents an alkyl radical of fewer than 4 carbon atoms. The term lower hydroxyalkyl radical is defined herein to mean a hydroxyalkyl radical wherein the alkyl group is straight- or branched-chained and contains fewer than 9 carbon atoms. When R in the foregoing formula is a lower hydroxyalkyl radical, preferred embodiments of this invention are those in which the group so represented contains fewer than 4 carbon atoms. The glycosyl radical in the foregoing formula is defined as a radical resulting from the detachment of the hemiacetal hydroxyl group from a cyclic modification of an aldose or ketose, the grouping —O—Glycosyl designated as a glycosyloxy radical, being identical with a glycoside radical. The term "glycoside" is further defined herein as a mixed acetal resulting from the exchange of an organic radical for the hydrogen of the hemiacetal hydroxyl group of a cyclic form of an aldose or ketose.

Compounds of the present invention can be manufactured by heating either an alkali metal salt of kojic acid (2-hydroxymethyl-5-hydroxy-4H-pyran-4-one), or kojic acid in the presence of a basic condensing agent with a halogenated sugar derivative of the formula Glycosyl—X wherein X represents a halogen atom, preferably bromine; followed by heating the resulting glycosyl derivative of kojic acid, suitably in aqueous medium, with ammonia, an amine of the formula Lower alkyl-NH$_2$ or an amine of the formula Lower hydroxyalkyl-NH$_2$ The net effect of the latter operation is to replace the heterocyclic oxygen atom of the kojic acid derivative with the group

N—R

R being defined as hereinbefore, with the consequent formation of a pyridone derivative; and concurrently to cause the hydrolysis of ester groupings present in the glycosyl radical. Illustrative of this novel process and the novel compositions obtained thereby, one can employ as a starting material a compound described in Journal of the American Chemical Society 56, 485 (1934) which has the structural formula

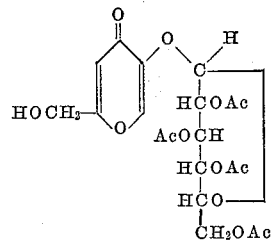

wherein Ac represents the acetyl (CH$_3$CO—) radical. In the reference cited this compound is named as 5-β-tetraacetyl-d-glucosidokojic acid and as 2-hydroxymethyl-5-β-tetraacetyl-d-glucosido-1,4-pyrone; it can also be named as 2-hydroxymethyl-5-(2,3,4,6-tetraacetyl-β-D-glucopyranosyloxy)-4H-pyran-4-one and as 2-hydroxymethyl-4-oxo-4H-pyran - 5 - yl 2,3,4,6 - tetraacetyl-β-D-glucopyranoside, the name last given being employed hereinafter in this disclosure. This starting material can be prepared by the method of the cited reference, or alternatively, by preparing 2,3,4,6-tetraacetyl-α-D-glucopyranosyl bromide according to the procedure of Organic Syntheses, Collective volume 3, page 11, and subjecting this compound in chloroform solution to reaction with an alkali metal salt of kojic acid as described in the example to follow.

Upon reaction of 2-hydroxymethyl-4-oxo-4H-pyran-5-yl 2,3,4,6-tetraacetyl-β-D-glucopyranoside with concentrated aqueous ammonia, as by heating it under superatmospheric pressure at 100° C., all of the ester groups present in the glycosyl radical are hydrolyzed to free hydroxyl groups, and the pyrone ring is converted to a pyridone ring by substitution of heterocyclic nitrogen for heterocyclic oxygen. The compound obtained as the result of these multiple transformations has the structural formula

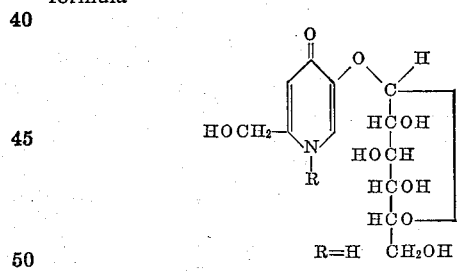

and can be named as 2-hydroxymethyl-5-β-D-glucopyranosyloxy-4(1H)-pyridone or as 1,4-dihydro-2-hydroxymethyl-4-oxo-5-pyridyl β-D-glucopyranoside. The latter type of nomenclature is generally employed in this disclosure.

In compositions of the structure presented immediately hereinbefore, when R represents alkyl or hydroxyalkyl, the compounds thus designated can be regarded as having precisely the pyridone structure formulated. However, when R represents hydrogen, the compounds thus designated can also exist in the form of the tautomeric 4-hydroxypyridines of the type of

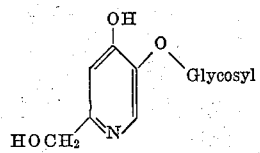

Such ketonic and enolic tautomeric forms are equivalent for the purposes of this invention, and to facilitate an understanding of the interrelationship of the compounds claimed hereinafter, they have been uniformly represented by the pyridone tautomer in those instances which admit of tautomerism.

Other novel compositions of this invention can be obtained by altering the glycoside group. This result is conveniently accomplished as follows: A polyacetyl derivative of a sugar is prepared and converted to the 1-bromo derivative by reaction with hydrogen bromide. The bromo derivative thus obtained is reacted with kojic acid in the presence of a basic condensing agent, and the glycoside is formed, regularly with inversion of configuration at the carbon atom attached to the glycosidic oxygen atom. Such glycosides are then subjected to reaction with ammonia and amines, with pyridone formation and hydrolysis of ester groupings as described hereinbefore. Representative sugars which can be applied in the foregoing procedures are D-mannose, D-galactose, D-glucose, and enantiomorphs and stereoisomers thereof.

The compositions of the present invention can advantageously be employed in pharmaceutical applications, because they are easily manufactured substances, of substantial water solubility, which exhibit certain of the useful properties of the adrenocortical hormones. Thus, they are anti-inflammatory agents, as shown by their effectiveness in treating inflammation of the iris. Likewise, they also resemble cortisone and hydrocortisone in producing a decrease in vascular permeability, by increasing the resistance of the vascular wall to injury. The compositions herein claimed are also anti-bacterial agents, and can specifically be employed in producing an inhibition of the growth of *Bacillus subtilis*.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

*Example 1*

A solution of 44 parts of kojic acid and 16 parts of potassium hydroxide in 80 parts of water is diluted with 240 parts of ethanol and immediately added, with stirring, to a solution of 115 parts of 2,3,4,6-tetraacetyl-α-D-glycopyranosyl bromide in 180 parts of chloroform. The stirred reaction mixture is heated under reflux for 30 minutes, following which the clear, orange-red mixture is cooled and poured into 3000 parts of cold water. The separated aqueous phase is extracted with a total of 1800 parts of chloroform in three equal portions, and the combined chloroform solution is dried over calcium chloride, decolorized with activated carbon, and filtered. Almost all of the chloroform is removed from the filtrate by a vacuum distillation, and the resulting orange, crystalline slurry is filtered. The solid product is washed with ether and then recrystallized from 95% ethanol to afford white needles which melt at about 197–199° C. and have a specific rotation of about −89° in chloroform solution. This compound is 2-hydroxymethyl-4-oxo-4H-pyran-5-yl 2,3,4,6-tetraacetyl-β-D-glucopyranoside of the structural formula shown hereinbefore.

*Example 2*

A mixture of 4 parts of 2-hydroxymethyl-4-oxo-4H-pyran-5-yl 2,3,4,6-tetraacetyl-β-D-glucopyranoside and 18 parts of concentrated aqueous ammonia is heated for 30 minutes at 100° C. in a glass-lined steel reaction vessel capable of withstanding substantial pressures. The clear brown reaction mixture is then concentrated until almost all of the water and ammonia are removed, after which crystallization of the residue is induced by such means as chilling and scratching with a glass rod. The crude crystallizate is recrystallized by dissolving it in 15 parts of warm water, treating the solution with decolorizing carbon, filtering, diluting the filtrate with 80 parts of hot isopropyl alcohol, and cooling. If necessary, crystallization is initiated by seeding the solution. The product obtained by filtration consists of shiny, cream-colored needles which melt at about 240–242° C. with decomposition to a frothy brown liquid. The specific rotation is about −111° in water. This compound is 1,4-dihydro-2-hydroxymethyl-4-oxo-5-pyridyl β-D-glucopyranoside which has the structural formula

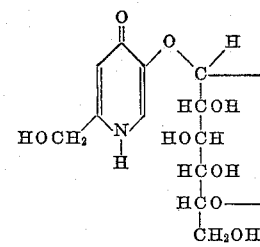

*Example 3*

A mixture of 6 parts of 2-hydroxymethyl-4-oxo-4H-pyran-5-yl 2,3,4,6-tetraacetyl-β-D-glucopyranoside and 11 parts of an aqueous methylamine solution (containing 25% by weight of methylamine) is heated at about 90–100° C. for 1 hours. The resultant clear brown reaction mixture is concentrated to about one-half of its original volume. Crystallization is then initiated by such means as adding a small quantity of anhydrous ethanol, warming the mixture and scratching the wall of the vessel with a glass rod. The solid product is collected and recrystallized by dissolving it in 10 parts of warm water, decolorizing with activated carbon, filtering, and diluting the filtrate with about 80 parts of ethanol. The 1,4-dihydro-1-methyl-2-hydroxymethyl-4-oxo-5-pyridyl β-D-glucopyranoside is obtained as white crystals which melt at about 225–230° C. with decomposition to a frothy brown liquid. This compound has a specific rotation of about −112° in water. The structural formula is

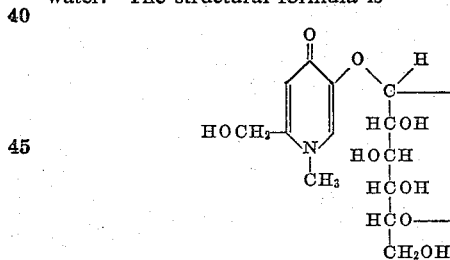

*Example 4*

By the procedure of Example 1, with the substitution of 115 parts of 2,3,4,6-tetraacetyl-α-D-mannopyranosyl bromide for the 2,3,4,6-tetraacetyl-α-D-glucopyranosyl bromide, the compound obtained is 2-hydroxymethyl-4-oxo-4H-pyran-5-yl 2,3,4,6-tetraacetyl-β-D-mannopyranoside. When 6 parts of this compound is substituted for the 2-hydroxymethyl-4-oxo-4H-pyran-5-yl 2,3,4,6-tetraacetyl-β-D-glucopyranoside in the procedure of Example 3, the compound obtained is 1,4-dihydro-1-methyl-2-hydroxymethyl-4-oxo-5-pyridyl β-D-mannopyranoside which has the structural formula

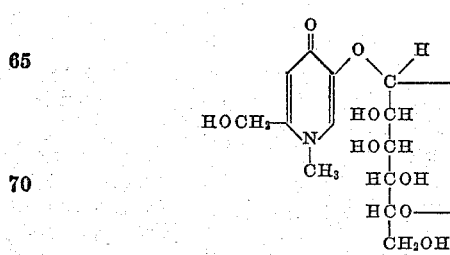

*Example 5*

A stirred mixture of 9.9 parts of 2-hydroxymethyl-4- oxo-4H-pyran-5-yl 2,3,4,6-tetraacetyl-β-D-glucopyranoside and 20 parts of aqueous ethylamine (containing 33% by weight of ethylamine) is heated at about 90–100° C. for 1½ hours, following which crystallization of the reaction product is induced. (The induction of crystallization can be achieved by a method such as the following. A small portion of the reaction mixture is concentrated under reduced pressure to approximately one-fourth of its original volume, following which the vessel in contact with the liquid is occasionally scratched with a glass rod, and the mixture is seeded with a crystal of one of the analogous pyridone derivatives described in this disclosure. Seed crystals obtained by this method, or by a method similarly calculated to induce crystal formation, are used to seed the entire reaction mixture obtained hereinbefore.) Upon crystallization, the product separates from the reaction mixture as a light brown, crystalline slurry. This product is collected on a filter and dissolved in about 240 parts of warm isopropyl alcohol. The isopropyl alcohol solution is treated with decolorizing carbon, filtered, cooled, and diluted with about 1750 parts of benzene. The cream-colored microcrystalline precipitate is collected on a filter and recrystallized by dissolving it in about 20 parts of warm water, treating the aqueous solution with decolorizing carbon, filtering, cooling, seeding, and slowly stirring about 55 parts of acetonitrile into the solution. The product is initially obtained as white needles which constitute a hydrate melting at about 95–97° C. The water or solvent is in part tenaciously held. For example, upon drying in a vacuum for 24 hours at 80° C. and then for 48 hours at 100° C., the composition recovered is not the completely anhydrous form, but rather a solvate corresponding to the retention of about 1–2% of water. The hydrated product so obtained melts to a very viscous liquid in the range of about 125–135° C., and exhibits a specific rotation of about —98.5° in water. This compound is 1,4-dihydro-1-ethyl-2-hydroxymethyl-4-oxo-5-pyridyl β-D-glucopyranoside, which has the structural formula, corresponding to its anhydrous form

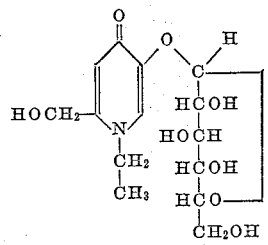

*Example 6*

A stirred mixture of 9.4 parts of 2-hydroxymethyl-4-oxo - 4H - pyran-5-yl 2,3,4,6-tetraacetyl-β-D-glucopyranoside, 8.5 parts of ethanolamine and 20 parts of water is heated under reflux for one hour. The water is removed from the clear, dark brown reaction mixture by vaporization; complete removal of the water is ensured by finally carrying out an azeotropic distillation with benzene. The viscous, syrupy residue which remains after removal of the water and benzene is dissolved in 160 parts of anhydrous ethanol, and crystallization is induced by such means as seeding with crystals previously obtained by triturating the syrup with ethanol. The product is slow to crystallize and should be allowed to stand at room temperature until completion of this process is evident; typically, about 24 hours is required. The product is then collected and recrystallized, with decolorization, from anhydrous ethanol. This recrystallization requires a relatively large volume of ethanol for dissolution, followed by concentration to a small volume for recovery. For example, satisfactory results are obtained by dissolving 2 parts of the product in 1200 parts of anhydrous ethanol, and concentrating the solution to about 80 parts before crystallization is initiated. The product obtained by filtration is 1,4 - dihydro - 1 - (β - hydroxyethyl)-2-hydroxymethyl-4-oxo-5-pyridyl β-D-glucopyranoside, comprising white crystals which melt at about 201–203° C. and exhibit a specific rotation of about —95° in water. The structural formula is

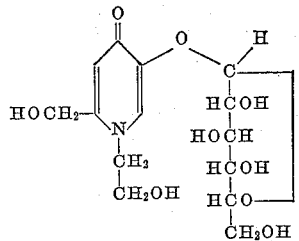

*Example 7*

A mixture of 6 parts of 2-hydroxymethyl-4-oxo-4H-pyran-5-yl 2,3,4,6-tetraacetyl-β-D-glucopyranoside, 6.7 parts of 3-amino-1-propanol and 15 parts of water is heated at about 90–100° C. for one hour. The clear, dark brown reaction mixture is cooled and diluted with about 25 parts of anhydrous ethanol. Crystallization is induced, and the product which separates is collected and recrystallized, with decolorization, from ethanol or from aqueous ethanol. For example, a decolorized solution in 400 parts of anhydrous ethanol is filtered and concentrated to about 80 parts for crystallization. The recovery of product can be improved by adding a quantity of water prior to crystallization, and a medium which comprises about 4 parts of ethanol to 1 part of water is a recommended concentration. The recrystallized product is collected and dried at 100° C. for 12 hours in a vacuum. It consists of white crystals which melt at about 202–206° C. and exhibit a specific rotation of about —85° in water. This compound is 1,4-dihydro-1-(γ-hydroxypropyl)-2-hydroxymethyl-4-oxo-5-pyridyl β-D-glucopyranoside which has the structural formula

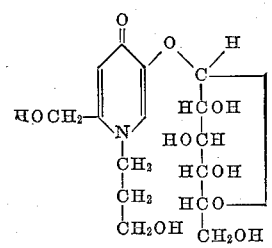

What is claimed is:
1. A glycoside of the formula

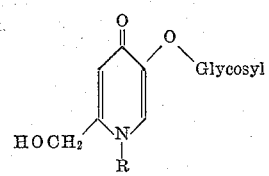

wherein R is a member of the class consisting of hydrogen, lower alkyl radicals, and lower hydroxyalkyl radicals in which the hydroxyl group is separated from the cyclic nitrogen atom by at least two carbon atoms.
2. A glycoside of the formula

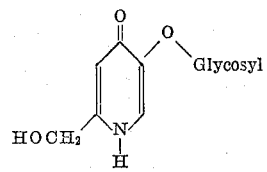

3. 1,4-dihydro-2-hydroxymethyl-4-oxo-5 - pyridyl β-D-glucopyranoside.

4. A glycoside of the structural formula

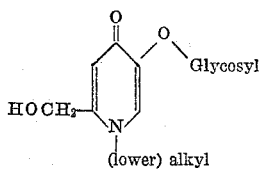

5. 1,4 - dihydro - 1 - methyl - 2 - hydroxymethyl - 4 - oxo-5-pyridyl β-D-glucopyranoside.
6. 1,4 - dihydro - 1 - ethyl - 2 - hydroxymethyl - 4 - oxo-5-pyridyl β-D-glucopyranoside.

7. A glycoside of the formula

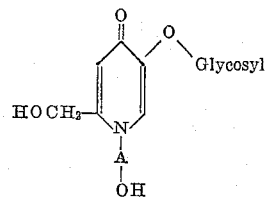

wherein A is a lower alkylene radical separating the groups attached thereto by at least two carbon atoms.
8. 1,4 - dihydro - 1 - (β-hydroxyethyl) - 2 - hydroxymethyl-4-oxo-5-pyridyl β-D-glucopyranoside.
9. 1,4 - dihydro - 1 - (γ - hydroxypropyl) - 2 - hydroxymethyl-4-oxo-5-pyridyl β-D-glucopyranoside.

No references cited.